United States Patent

[11] 3,591,254

[72] Inventors Arthur Browne
Horley, Surrey;
John Siegfried Palfreeman, Betchworth,
both of, England
[21] Appl. No 807,882
[22] Filed Mar. 17, 1969
[45] Patented July 6, 1971
[73] Assignee U. S. Philips Corporation
[32] Priority Mar. 18, 1968
[33] Great Britain
[31] 12705/68

[54] APPARATUS FOR PRODUCING A PLANE POLARIZED BEAM WITH A ROTATING PLANE OF POLARIZATION
7 Claims, 2 Drawing Figs.

[52] U.S. Cl. .................................................. 350/149,
250/199, 350/150, 350/157, 350/161, 350/169
[51] Int. Cl. ........................................................ G02f 1/24

[50] Field of Search.................................................. 350/149,
150, 157, 160—161, 169—174; 250/199

[56] References Cited
UNITED STATES PATENTS

| | | | |
|---|---|---|---|
| 3,111,666 | 11/1963 | Wilmotte...................... | 350/149 X |
| 3,383,460 | 5/1968 | Pritchard...................... | 350/157 UX |
| 3,393,955 | 7/1968 | Sterzer ......................... | 350/150 |
| 3,430,048 | 2/1969 | Rubinstein ................... | 350/169 |

*Primary Examiner*—David Schonberg
*Assistant Examiner*—Paul R. Miller
*Attorney*—Frank R. Trifari

ABSTRACT: A plane polarized beam with a rotating angle of polarization is produced by splitting a beam into two phase coherent plane polarized beams with orthogonal direction of polarization. The split beams are amplitude modulated with envelopes in phase quadrature and recombined.

PATENTED JUL 6 1971
3,591,254
FIG.1.
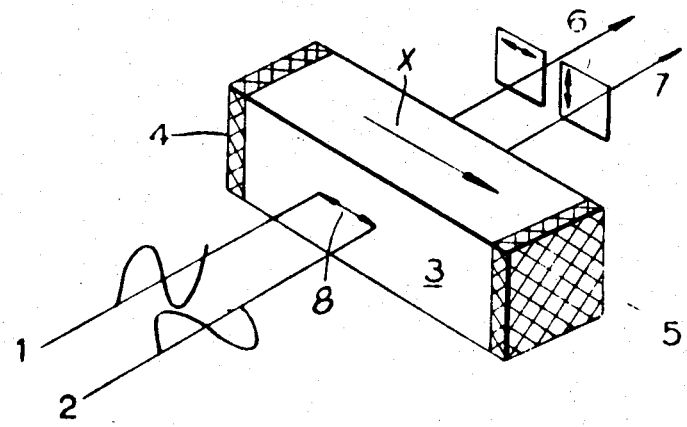
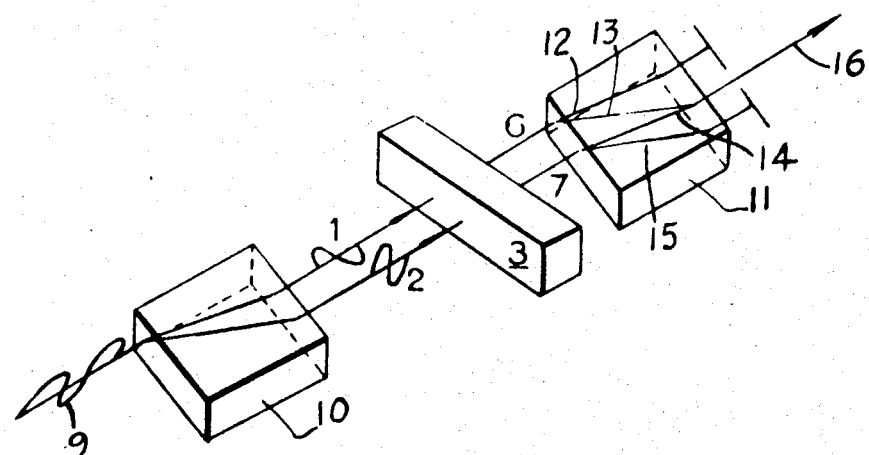
FIG.2.
INVENTORS
ARTHUR BROWNE
JOHN S. PALFREEMAN
BY
AGENT

APPARATUS FOR PRODUCING A PLANE POLARIZED BEAM WITH A ROTATING PLANE OF POLARIZATION

This invention relates to apparatus for producing a plane polarized beam of light with the plane of polarization rotating at high speed, that is to say, having a selected angular velocity which may be for example between 1 kHz. and 100 MHz or even higher.

A light beam having this property may be employed for example in measurement apparatus, but such application does not form part of the present invention.

According to the invention apparatus for producing a plane polarized beam of light with the plane of polarization rotating comprises a source emitting a beam of light, means for splitting the beam into two rays which are phase-coherent and polarized in orthogonal planes, means for amplitude-modulating the rays with the modulation envelopes in quadrature, and means for recombining the amplitude-modulated rays to produce the required beam. Preferably the beam splitting and recombining means are doubly refracting crystals and the amplitude modulator is a photoelastic delay-line through which the rays are passed and which is stressed by a travelling acoustic wave. The spacing of the rays incident on the delay-line is chosen so that they are a quarter wave apart at the frequency of the travelling acoustic wave. In order to provide a fine adjustment to meet this requirement, the frequency, and hence the wavelength, of the acoustic wave can be made variable.

In order that the invention may be more clearly understood, it will now be described with reference to the accompanying drawings, in which:

FIG. 1 is a diagrammatic perspective view of a photoelastic delay-line with incident and emerging light rays, and FIG. 2 is a diagrammatic perspective view of a photoelastic delay-line with beam splitting and recombining means. In both the drawings the photoelastic delay-lines are shown using a shear acoustic wave propagation. For compressional acoustic waves the planes of polarization of the light rays must be rotated by 45°.

It is known that the amplitude of a light ray may be varied by an acoustic wave travelling in a medium through which the ray passes. It is also known that the amplitude of the output ray is proportional to the sine of the strain in the medium but for small strains is proportional to the strain.

Referring now to FIG. 1, a photoelastic delay-line 3 is provided with an input transducer 4 which sends an acoustic wave in the direction of the arrow X. At the other end of the delay-line 3 is an absorber 5 which reduces internal reflection of the wave and thus substantially prevents the formation of a standing wave along the line. Two rays of orthogonally polarized light 1 and 2 are passed through the photoelastic delay-line 3 at right-angles to the direction of the acoustic wave direction, and a quarter of an acoustic wavelength apart, 8. The resulting emergent light rays 6 and 7 now display amplitude-modulated envelopes which are in quadrature and have a frequency of the acoustic wave. If the emergent light rays 6 and 7 are recombined, a light beam is obtained which is plane polarized with the plane of polarization rotating at the frequency of the acoustic wave.

In FIG. 2 a doubly refracting crystal 10 is shown for splitting a single plane polarized light ray 9 into two emergent rays 1 and 2, each of which is plane polarized with the planes normal to one another and each making an angle of 45° with the single light ray 9. By suitable choice of crystal together with its dimensions and orientation it can be arranged that the emergent rays 1 and 2 are one quarter of a wavelength apart. The two rays 1 and 2 are passed through the photoelastic delay-line modulator 3, which operates in the same manner as that shown in FIG. 1, and the processed rays 6 and 7 are then caused to be incident on a second doubly refracting crystal 11. The modulated ray 6 is now doubly refracted to give emergent rays 12 and 13 and the modulated ray 7 is also doubly refracted to give emergent rays 14 and 15. As is seen from FIG. 2, the rays 13 and 14 combine to give a single output ray 16 which displays the required rotation of the plane polarized light due to the vectorial summation of the modulated rays. It will be clear that both the doubly refracting crystals 10 and 11 must provide identical paths for the two light rays.

It will also be clear to those skilled in the art that the initial plane polarized ray must have a low divergence and be narrow in the direction of the length of the modulator. Errors in these respects will tend to spread the orientation of the plane of polarization of the output beam.

What we claim is:

1. Apparatus for producing a plane polarized beam of light with a rotating plane of polarization, comprising a source emitting a beam of light, means for splitting the beam into two phase coherent rays polarized in orthogonal planes, means for amplitude-modulating the phase coherent rays with the identical modulation frequency and with the modulation envelope in phase quadrature, and means for recombining the amplitude-modulated rays to produce the required beam.

2. Apparatus for producing a plane polarized beam of light with the plane of polarization rotating as claimed in claim 1, wherein said beam splitting and recombining means are doubly refracting crystals.

3. Apparatus for producing a plane polarized beam of light with the plane of polarization rotating as claimed in claim 1, wherein said beam splitting doubly refracting crystal comprises means for separating the resultant rays by one quarter of a wavelength of the modulating frequency.

4. Apparatus as claimed in claim 3 wherein said amplitude-modulator means comprises a photoelastic delay-line through which the split rays are passed.

5. Apparatus as claimed in claim 4, wherein said photoelastic delay-line comprises a transducer on one end of the delay line producing a shear mode acoustic wave traversing the delay-line body, and an absorber on the other end of the delay-line to prevent the formation of standing waves.

6. Apparatus as claimed in claim 4, wherein said photoelastic delay-line includes a transducer means on one end of the delay line for producing a compressional longitudinal acoustic wave traversing the delay-line body and an absorber on the other end of the delay-line to prevent the formation of standing waves, and wherein the incident split rays are suitably angularly oriented to provide the amplitude modulation of said split rays.

7. Apparatus as claimed in claim 1 wherein the frequency of the means for amplitude modulation of the split rays is made variable.

UNITED STATES PATENT OFFICE
CERTIFICATE OF CORRECTION

Patent No. 3,591,254　　　　　　　　Dated July 6, 1971

Inventor(s) Arthur Browne et al.

It is certified that error appears in the above-identified patent and that said Letters Patent are hereby corrected as shown below:

Change Priority date from "March 18, 1968" to
-- March 15, 1968 --.

Signed and sealed this 11th day of April 1972.

(SEAL)
Attest:

EDWARD M. FLETCHER, JR.　　　　　　ROBERT GOTTSCHALK
Attesting Officer　　　　　　　　　Commissioner of Patents